United States Patent [19]

Hummel

[11] Patent Number: 4,899,853

[45] Date of Patent: Feb. 13, 1990

[54] HYDRAULIC SHOCK-ABSORBER AND VIBRATION DAMPER WITH AN INNER TUBE

[75] Inventor: Kurt M. Hummel, Wuppertal, Fed. Rep. of Germany

[73] Assignee: Herman Hemscheidt Maschinenfabrik GmbH & Co., Wuppertal, Fed. Rep. of Germany

[21] Appl. No.: 275,915

[22] Filed: Nov. 25, 1988

[30] Foreign Application Priority Data

Nov. 28, 1987 [DE] Fed. Rep. of Germany ....... 3740404

[51] Int. Cl.$^4$ ................................................. F16F 9/06
[52] U.S. Cl. ..................................... 188/269; 188/318
[58] Field of Search ............... 188/269, 313, 318, 314; 267/64.13, 64.16; 280/708

[56] References Cited

U.S. PATENT DOCUMENTS 3,960,251  6/1976  Gorissen ......................... 188/318 X

FOREIGN PATENT DOCUMENTS 1079474  3/1984  U.S.S.R. ............................ 267/64.13
0493657  10/1938  United Kingdom ................. 188/269

Primary Examiner—Robert J. Oberleitner
Attorney, Agent, or Firm—Berman, Aisenberg & Platt

[57] ABSTRACT

A hydropneumatic shock-absorber and vibration damper comprising a cylinder (1) a damping piston (2) disposed for axial movement inside the cylinder (1) and dividing off two working chambers filled with a hydraulic damping medium and connected by a connection which includes at least one throttle, a piston rod (3) mechanically connected to the damping piston and guided outwardly from the cylinder (1) in sealing-tight manner, a compensating chamber (11) connected to one (9) of the working chambers (9, 10) for receiving a volume of damping medium displaced by the piston rod (3), and a pneumatic spring chamber (13) filled with a compressible medium and separated in sealing-tight manner from the compensating chamber (11) by a freely movable floating piston (12). The piston rod (3) is a hollow cylinder and the damping piston (2) is annular. An inner tube (6) extending with slight peripheral clearance through the annular damping piston (2) and into the hollow cylindrical piston rod (3) is disposed inside cylinder (1) and coaxial therewith. The piston (12) separating the compensating chamber (11) from the pneumatic spring chamber (13) is guided inside the inner tube (6).

3 Claims, 1 Drawing Sheet

U.S. Patent
Feb. 13, 1990
4,899,853
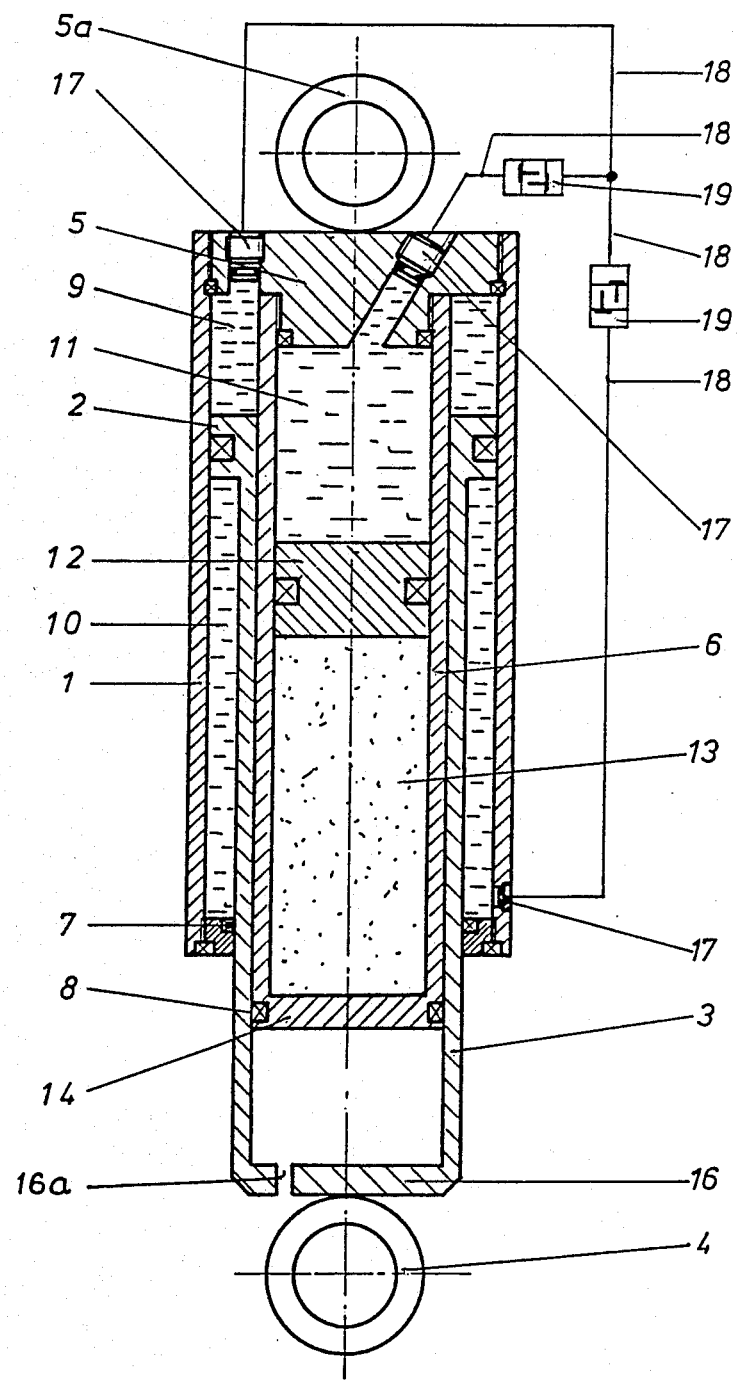

HYDRAULIC SHOCK-ABSORBER AND VIBRATION DAMPER WITH AN INNER TUBE

The invention relates to a hydropneumatic shock-absorber and vibration damper comprising a cylinder, a damping piston disposed so as to be axially movable inside the cylinder and dividing off two working chambers filled with a hydraulic damping medium and connected by at least one throttle means, a piston rod mechanically connected to the damping piston and guided outwardly from the cylinder in sealing-tight manner, a compensating chamber connected to one of the working chambers for receiving a volume of damping medium displaced by the piston rod, and a pneumatic spring chamber separated in sealing-tight manner from the compensating chamber by a freely movable floating piston and filled with a compressible medium.

In a shock-absorber of the aforementioned kind known from DE-OS No. 34 27 843, the compensating chamber is axially connected to one side of the cylinder via a passage in which an adjustable damping valve is disposed. The pneumatic spring chamber is also connected in the axial direction to the device via a partition wall, e.g. in the form of a diaphragm or a separating piston, the general result being that the known shock-absorber has a very disadvantageous overall length. Also, the piston rod is guided at only two places, i.e. via the damping piston guided in the cylinder and also in the region where it travels through the cylinder, and the resulting stability against lateral transverse forces is insufficient for certain applications.

Another hydropneumatic shock-absorber is known from DE-OS No. 30 49 385. In this known shock-absorber, the piston rod is a hollow cylinder and the damping piston has throttle openings, so that the damping medium can flow through the throttle openings in the damping piston, out of the cylinder space into the hollow cylindrical piston rod. The hollow cylindrical piston rod thus simultaneously constitutes a working chamber and a compensating chamber. A floating separating piston is mounted so as to be axially movable inside the hollow piston rod, and the damping fluid flowing into the piston rod through the throttle openings in the damping piston is separated by the separating piston from the pneumatic spring chamber, which is also formed inside the hollow piston rod. During the compression stroke, a quantity of damping fluid equal to the total volume of the piston rod is displaced into it. This likewise has the disadvantageous result that the vibration damper has a disadvantageous overall length. As before this known shock-absorber has insufficient transverse stability for many applications, since as before its piston rod is guided at only two places.

The object of the invention, starting from the previously-described prior art, is to devise a compact very stable shock-absorber having a small overall length.

According to this invention, this is achieved by an arrangement wherein both the compensating chamber and the separating piston and at least part of the volume of the pneumatic spring chamber are disposed inside the inner tube, which is coaxial with the cylinder. The volume of liquid displaced into the compensating chamber corresponds only to the wall thickness of the hollow cylindrical piston rod. This likewise contributes to a very short construction. According to the invention, the hollow cylindrical piston rod is guided over a large area on the inner tube, i.e. during the piston stroke its inner surface slides on the outer periphery of the inner tube. This construction according to the invention ensures high stability under all operating conditions, particularly against laterally acting transverse forces, so that the shock-absorber according to the invention is particularly suitable as a shock-absorbing leg for direct guidance of car wheels. Other advantages are explained in the following description.

The invention will now be described in detail by way of example with reference to the accompanying drawing. The single drawing shows an advantageous embodiment of a shock-absorber and vibration damper according to the invention in diagrammatic longitudinal section.

By way of example of drawing shows a hydropneumatic shock-absorber and vibration damper, hereinafter called a shock-absorber for short, which substantially comprises a cylinder 1, a damping piston 2 disposed for axial movement inside cylinder 1, and a piston rod 3 connected to piston 2 and guided in sealing-tight manner outwards from cylinder 1. At its free end, piston rod 3 has a connecting member 4 for connecting to a body (not shown) to be damped, e.g. a car wheel. A head part 5 of cylinder 1 is adapted to be connected by a member 5a e.g. to a vehicle frame (not shown).

According to the invention, the piston rod 3 is a hollow cylinder. An inner tube 6 secured to head part 5 is disposed coaxially inside cylinder 1 and extends approximately up to the end of cylinder 1 opposite head part 5 or, as shown, somewhat beyond and into the hollow cylindrical piston rod 3. For this purpose, the damping piston 2 is made annular so that it surrounds the inner tube 5 with slight peripheral clearance in an annular chamber formed in the cylinder between tube 6 and cylinder 1. Advantageously the inner wall of piston rod 3 is guided over the outer surface of tube 6 along the entire stroke of piston 2, so that the shock-absorber according to the invention has high stability. In order to seal the piston rod 3, an outer sealing ring 7 is disposed between it and cylinder 1, and an inner sealing ring 8 is disposed between the inner tube 6 and the inner periphery of piston rod 3.

The annular damping piston 2 divides the annular space in the cylinder into a top working chamber 9 facing the head part 5 and a bottom working chamber 10 facing away from part 5. Chambers 9 and 10 are each filled with a hydraulic damping medium. The top chamber 9 is connected to a compensating chamber 11 formed according to the invention inside the inner tube 6 and adapted to receive a volume of damping medium displaced by the piston rod 3.

According to the invention also, a floating piston 12 is freely movable inside the inner tube 6 so as to bound the compensating chamber 11, and in sealing tight manner separates chamber 11 from a pneumatic spring chamber 13 which is likewise at least partly formed inside the inner tube 6 and contains an elastically compressible medium such as air. In the embodiment of invention shown, the inner tube 6 is closed in a gas-tight manner in its free end region 14 facing the outwardly-guided end of piston rod 3, and the piston rod 3 has a vent opening 16a in its region 16 extending axially outwards of the inner tube 6. As a result, the pneumatic spring chamber 13 advantageously has a large volume, which influence the pneumatic spring force and/or the spring characteristic of the shock-absorber according to the invention.

In the embodiment of the invention shown, the cylinder 1 has three connecting members 17 for hydraulically connecting the two working chambers 9, 10 and the top working chamber 9 to the compensating chamber 11. One connecting member 17 opens into the bottom chamber 10, another into the top chamber 9 and another into the compensating chamber 11. The connecting members 17 opening into the top working chamber 9 and the compensating chamber 11 are disposed in ducts in the head part 5, whereas the connecting member 17 opening into the bottom working chamber 10 is disposed in the wall of the cylinder 1. External pipes or flexible connectings 18, shown in simplified form, can be connected to member 17. A throttle means comprising a throttle or damping valve 19 is preferably disposed in the line 18 between the two working chambers 9 and 10. A preferably adjustable damping valve 19 is connected in the line 18 connecting the top working chamber 9 to the compensating chamber 11. The shock-absorber according to the invention can also without difficulty e used for setting a level, by supplying or withdrawing damping medium through a connecting member 17 and the corresponding line 18.

In an alternative embodiment of the invention (not shown), the damping piston 2 can have throttle means in the form of axial through passages, in which throttle valves can be disposed. Likewise the top working chamber 9 can be connected to the compensating chamber 11 by at least one passage in the head part 5 of cylinder 1 and/or the inner tube 6, ion which case a damping valve is preferably disposed in the passage of the transition from working chamber 9 to compensating chamber 11.

The invention is not restricted to the embodiments shown and described but also includes all equivalent embodiments according to the invention.

I claim:

1. A hydro-pneumatic shock-absorber and vibration damper comprising a cylinder, an annular damping piston disposed inside the cylinder so as to be axially movable therein and dividing off two working chambers in the cylinder which are filled with a hydraulic damping medium, at least one throttle connecting the working chambers to each other, a piston rod in the form of a hollow cylinder mechanically connected to the damping piston and guided outwardly from the cylinder in sealing-tight manner, a compensating chamber connected to a first one of the working chambers for receiving a volume of damping medium displaced by the piston rod, a pneumatic spring chamber separated in sealing-tight manner from the compensating chamber by a freely movable floating piston and filled with a compressible medium, an inner tube extending with slight peripheral clearance through the annular damping piston and into the hollow piston rod so as to be inside the cylinder and coaxial therewith, the floating piston being guided inside the inter tube, wherein the free end region of the inner tube facing the outwardly-guided end of the hollow piston rod is closed in a gas-tight manner whereby the pneumatic spring chamber is bounded by said free end region of the inner tube and by the floating piston, and wherein the hollow piston rod has a vent opening in the part extending axially outwards of the inner tube.

2. A shock-absorber and vibration damper according to claim 1, wherein the working chambers and the compensating chamber each have a respective outwardly-directed connecting member which connects an external line to the respective chamber.

3. A shock-absorber and vibration damper according to claim 2, wherein a throttle valve is contained in the external connecting line.

* * * * *